United States Patent [19]
Bianco et al.

[11] Patent Number: 5,438,518
[45] Date of Patent: Aug. 1, 1995

[54] PLAYER POSITIONING AND DISTANCE FINDING SYSTEM

[76] Inventors: Joseph A. Bianco, 112 Rising Trail Dr., Middletown, Conn. 06457; Curtis A. Vock, 28 Federal St., 30-12, Salem, Mass. 01970; John V. Bianco, 24 Calvin Rd., Jamaica Plain, Mass. 02130

[21] Appl. No.: 183,594

[22] Filed: Jan. 19, 1994

[51] Int. Cl.$^6$ .................. G01S 5/14; A63B 71/06; A63B 57/00
[52] U.S. Cl. .................. 364/460; 364/411; 364/561; 273/32 R; 273/32 H; 340/995
[58] Field of Search ............... 364/449, 444, 410, 411, 364/561, 460; 342/357, 450, 451, 457; 273/32 R, 32 H; 340/995

[56] References Cited

U.S. PATENT DOCUMENTS

| | | | |
|---|---|---|---|
| 3,805,411 | 4/1974 | Andrews, Jr. | 35/7 R |
| 4,266,214 | 5/1981 | Peters, Jr. | 340/323 R |
| 4,297,701 | 10/1981 | Henriques | 343/6.5 LC |
| 4,321,678 | 3/1982 | Krogmann | 364/453 |
| 4,367,526 | 1/1983 | McGeary et al. | 364/411 |
| 4,480,310 | 10/1984 | Alvarez | 364/450 |
| 4,547,781 | 10/1985 | Gelhorn et al. | 346/33 R |
| 4,655,451 | 4/1987 | Townsley | 273/32 H |
| 4,665,404 | 5/1987 | Christy et al. | 342/463 |
| 4,698,781 | 10/1987 | Cockerell, Jr. | 364/561 |
| 4,703,444 | 10/1987 | Storms, Jr. et al. | 364/561 |
| 4,731,613 | 3/1988 | Endo et al. | 342/357 |
| 4,815,020 | 3/1989 | Cormier | 364/709.11 |
| 4,864,592 | 9/1989 | Lee | 377/5 |
| 4,879,658 | 11/1989 | Takashima et al. | 364/449 |
| 4,887,281 | 12/1989 | Swanson | 377/24.1 |
| 4,910,677 | 3/1990 | Remedio et al. | 364/410 |
| 4,922,444 | 5/1990 | Baba | 364/566 |
| 5,044,634 | 9/1991 | Dudley | 273/32 R |
| 5,056,106 | 10/1991 | Wang et al. | 375/1 |
| 5,058,023 | 10/1991 | Kozikaro | 364/450 |
| 5,214,679 | 5/1993 | Metcalf | 377/5 |
| 5,225,842 | 7/1993 | Brown et al. | 342/357 |
| 5,245,537 | 9/1993 | Barber | 364/410 |
| 5,319,548 | 6/1994 | Germain | 364/410 |
| 5,324,028 | 6/1994 | Luna | 273/32 R |
| 5,364,093 | 11/1994 | Huston et al. | 273/32 R |

OTHER PUBLICATIONS

GPS Technology and Opportunities; Harris et al; Paper Presented at Expo Comm China '92; Beijing, China; Oct. 30–Nov. 4.
Julpe, "You're never out of range of the master–Sahara unveils computerized 'caddy'", *Sahara Country Club Sports,* Las Vegas Sun (undated).
Carey, "Sextants in Space Can Change the World" Wall Street Journal (1993).
Webster, "Device hastens flood aid", The Arizona Republic, pp. B4–B5 (Sep. 7, 1993).
Chien, (Illustration by Dimare) "You Are Here", Popular Mechanics, pp. 50–52 (Nov. 1993).
Robinson, Abstract "Using Bus Level IRIG Time Code Translators To Time Tag Data And Synchronize Multiple Processing Stations" (undated).

(List continued on next page.)

Primary Examiner—Michael Zanelli
Attorney, Agent, or Firm—John V. Bianco; Curtis A. Vock

[57] ABSTRACT

The invention relates to a portable distance tracking system for use by a player on a playing field. The system includes a mobile interface unit that has a memory element, position interface electronics, a data processor, and a player interface. The memory element stores digitized map representations of playing fields. The position interface electronics receivers position indicative signals that are representative of a geographical location of the mobile unit from an external source. The data processor couples to the memory element and to the position interface electronics and correlates the geographical location to a field location of the mobile interface unit on the playing field. The processor also determines the distance from the mobile interface unit to a first landmark. The player interface is coupled to the data processor and communicates the distance between the mobile interface unit and the first landmark to the player. According to a preferred embodiment, the playing field is a golf course and the first landmark is a flag location at a select hole on the golf course.

43 Claims, 11 Drawing Sheets

OTHER PUBLICATIONS

Freeman, "Physical Engineering", Popular Mechanics, pp. 33–35 (Dec. 1993).

Cannon et al., "Testing a Lightweight GPS/GIS Terminal for Sub-Meter DGPS Positioning", ION GPS93, Salt Lake City (Sep. 22–24, 1993).

Ellowitz, "The Global Positioning System", Microwave Journal, pp. 24–33 (Apr. 1992).

Ardö et al., "On the accuracy of the global positioning system–A test using a hand-held receiver", 13 Int. J. Remote Sensing, 3229–3233 (1992).

Gibbons, "The Global Positioning System as a Complementary Tool for Remote Sensing and other Applications", 58 Photogrammetric Eng. & Remote Sensing, 1255–1257 (Aug. 1992).

Soler et al., "Accurate Determination of Cartesian Coordinates at Geodetic Stations Using the Global Positioning System", 19 Geophys. Res. Letters, 533–536 (Mar. 20, 1992).

Horiai, "Accuracy of time comparison derived from reception of Loran-C and Global Positioning System time signals", 27 Radio Sci., 545–551 (Sep.–Oct. 1992).

Wassef et al., "An Investigation into the Integrity of Surveying With the Global Positioning System (GPS)", 14 J. Geodynamics, 51–58 (1991).

Publication "Sensor Markets and Technologies Update; Riegl USA Senses Pulse of Laser Rangefinder Market", Vital Information Publications (Monday, Nov. 15, 1993).

Gething, "Radio Direction Finding and Superresolution", Peter Peregrinus Ltd. on behalf of the Institution of Electrical Engineers, Chapters 1–3, 5, and p. 1 of Chapter 7 (undated).

Motorola GeoResearch, Inc. product information sheet "GeoLink Mapping System® Live Map TM" (undated).

Motorola brochure "LGT 1000 TM Terminal Lightweight GPS/GIS Terminal" (Mar., 1993).

Motorola brochure "Sixgun TM 6000 Series DGPS Receivers and DGPS Systems" (1993).

Datum, Inc. data information sheet "bc63 VME/bc357VXI GPS Satellite Receiver" (1991).

Datum, Inc. data information sheet "bc627AT GPS Satellite Receiver" (1991).

Datum, Inc. data information sheet "TYMSERVE TM 2000 LAN Time Server" (1993).

RangeMaster TM Golf Enterprises product information sheet "A Yardage Based Course Management System" (undated).

RangeMaster TM Golf Enterprises product information sheet (undated).

PLAYER POSITIONING AND DISTANCE FINDING SYSTEM

BACKGROUND OF THE INVENTION

This invention relates generally to an electronic system for providing information to players on a playing field. More particularly, it relates to a system for determining the position of a golfer on a golf course and for communicating that position along with other relevant information to the golfer.

There are many thousands of golf courses in the United States and abroad, and tens of millions of people who play golf. Some people who play golf regularly do so at the same course. However, quite often golfers playing at a course are unfamiliar with the course topography. To accommodate these players, course operators provide maps, usually as part of a score card, which illustrate the layout of the course and which indicates the distance from the tee to the flag for each hole. Additionally, the courses usually include distance markers placed at various locations along the course. By way of example, at golf courses located in the United States, each hole typically includes a distance marker located along the fairway to indicate when a golfer is 150 yards from the flag.

In addition to such aids provided by golf courses, there are also a variety of prior art distancing and ranging devices. These devices can include systems for assisting a golfer's performance. They can also include some mechanism for attempting to measure distances between a golfer and a variety of landmarks on a golf course. Such prior art devices employ a variety of methods to perform distance measurements. Some rely on visually siting the flag, while others require the flag to act as a receiver or transmitter of some sort. Other prior art systems rely on developing a coordinate system for the golf course and use linear accelerometers to track a golfer's movement along the course. Yet other systems require the golf course to install tracking sensors below the fairway turf.

There are several drawbacks with regard to the prior art systems for informing golfers as to their position on a golf course. One drawback is that the maps provided are usually very small; typically all eighteen holes are contained on a card that is approximately 3"×5" in size, thus lacking sufficient detail. By way of example, the maps often provide the distance from the tee to the flag and the general shape of the fairway, but fail to indicate the location of hazards such as accumulations of water and sand traps. Even when a course map depicts hazards, it virtually never provides distances to those hazards, nor does it typically provide other important distances, such as to the front of the green or to the back of the green. Another drawback is that the maps and markers which the course operators provide are often not up to date. As a golf season progresses, courses can become worn from over-use. Consequently, course operators periodically relocate the tees and the flags. As a result, the distance information provided by the maps and the markers is often inaccurate. A further drawback of the prior art systems is that the distance markers positioned on the course are sometimes difficult to locate. Often, for example, common looking shrubs are used as distance markers. At other golf courses, small stakes are located along the edge of the fairway. Still other courses place small metal or cement plates in the ground.

Because these distance markers are difficult to locate, and because the maps are very small, their usefulness is impeded for those who need them most: golfers who have never played the course and those golfers who are visually impaired.

Another significant drawback in prior art golf location systems that utilize a score card and accompanying map is that it is difficult for a golfer to track historical information with regard to play at a particular course. Accordingly, unless a golfer takes notes and saves old score cards, it is virtually impossible for the golfer to recollect performance on a given hole, particularly if the golfer only plays a course a few times each year. Consequently, no effective learning occurs, even if the golfer encounters the same situation more than one time.

Other more automated prior art systems also suffer from several disadvantages. Certain of those systems require siting the flag to operate continuously. Consequently, if a player cannot see the flag, that player cannot use the system to determine distance. This situation can be exacerbated by players forgetting to replace the flag. Another disadvantage to some prior art golf location systems is that they require special tracking sensors to be installed. Such installation can be labor intensive and also disruptive to play. Additionally, maintenance of the tracking systems can be costly. Furthermore, other prior art electronic systems are typically complex and expensive, in the methods employed to acquire positional information.

Accordingly, one object of the invention is to provide golfers with information regarding their position on a golf course.

Another object of the invention is to provide golfers with information regarding their distance to the flag.

An additional object of the present invention is to provide golfers with information regarding distances to hazards on a golf course.

A further object of the invention is to provide golfers with accurate distance information on a golf course, regardless of the movement of the tees and the flags.

Another object of the present invention is to provide golfers with adaptive information regarding proper club selection.

An additional object of the present invention is to provide visually impaired golfers with positional, distance, and other related information in a conveniently usable format.

Other general and specific objects of the invention will in part be obvious and will in part appear hereinafter.

SUMMARY OF THE INVENTION

The invention relates generally to an electronic system for providing information to players on a playing field. More particularly, the invention provides a portable distance tracking system for determining the position of a player and for communicating that position, along with other relevant information to the player.

According to one embodiment of the invention, the playing field includes at least a first landmark and the tracking system comprises at least one mobile interface unit. The mobile interface unit includes a memory element, position interface electronics, a data processor, and a player interface. The memory element stores digitized map representations of at least one playing field. In one preferred embodiment, the playing field is a golf course and the map representations are digitally scanned arial photographs of the golf course. As those skilled in the art will appreciate, any number of conventional methods of digitizing map information can be employed to store a representation of the playing field in the memory element. According to a further embodiment, the memory element is replaceable. In this way, different memory elements containing different playing fields can be swapped in and out of the mobile interface unit. Thus, in the case of the playing field being a golf course, a golfer can insert a particular memory element, which is dependent upon which golf course is to be played. Alternatively, a single memory element can contain map representations for a plurality of playing fields, thereby reducing the frequency with which the memory element need be replaced. Alternatively, the memory element is updateable and is overwritten with new golf course information via a data link interface.

The position interface electronics receive position indicative signals from an external source. The position indicative signals are representative of a location of the mobile interface unit. According, to one embodiment, the position interface electronics receives the position indicative signals from a global positioning system satellite constellation located in orbit around the Earth. In this case, the signals from the constellation provide the position interface electronics with the geographical position of the mobile interface unit.

The invention can also employ a differential global positioning system. According to the differential system, a master global positioning system unit is located at a fixed location having a known longitude and latitude. The master unit receives the position indicative signals from the satellite constellation, calculates its longitude and latitude, and transmits an error correction signal to the mobile interface unit, wherein the error correction signal is based at least in part on a difference between said known longitude and latitude and the calculated longitude and latitude. The mobile interface unit receives the error correction signal from the global positioning system master unit, and processes the error correction signal with the position indicative signals to determine a corrected geographical position of said mobile interface unit.

The data processor couples to the memory element and to the position interface electronics and correlates the geographical location of the mobile interface unit with the digitized map representation of the playing field to determine a field location of the mobile interface unit on the playing field. The data processor also determines the distance between the mobile interface unit and the first landmark. The player interface, couples to the data processor and communicates at least the distance between the mobile interface unit and the landmark to the player.

In the case where the playing field is a golf course, the first landmark can be the flag location of a particular hole on the course. According to further embodiments, the player interface includes a keyboard interface and a visual display. The visual display can automatically provide a graphical display of a hole being played on the golf course. The display can show various landmarks, as trees, water hazards, boundary markers, sand traps, distance markers, the green location. In other aspects, the display also provides distances from the mobile interface unit to the displayed landmarks and also the distances between selected landmarks.

The keyboard enables the golfer to set certain initialization parameters and also to request various relevant information while playing a round of golf. By way of example, a golfer can set the distance that he or she expects to hit each golf club. According to one embodiment, during play the mobile interface unit displays club suggestions based in part on the golfer's distance from a particular landmark and in part on the club distances previously set. According to a further embodiment, the mobile interface unit automatically revises the club distances previously set in response to a golfer's actual performance. The keyboard also enables the golfer to enter for storage and/or display various information while playing a round of golf. For example, according to further embodiments of the invention, a golfer can enter the score on a particular hole, the number of penalty shots taken, and the number of putts taken. The memory element can store this information for later recall by the golfer.

According to another embodiment of the invention, the system includes a central computer. The central computer includes a communications link for interfacing with the mobile interface unit. The central computer can provide the mobile interface unit with such information as updated course information. Additionally, following a round of golf, the mobile interface unit can download such information as scores on each hole, number of putts on each hole, number penalty strokes, distances of particular shots and other like information. The central computer can then process, store and if requested print out reports in various formats concerning the downloaded information.

In still other aspects of the invention, the invention provides for a system which determines the distance to a hole on a golf course. A GPS receiver is arranged to receive a global earth position, and a processor subsystem communicates with the GPS receiver to correlate the GPS signals into a local position on the golf course. A memory element is also included to store locations on the golf course which include at least one hole of the golf course. The golf course locations are representations of the local coordinates wherein the processor correlates the GPS signals into the coordinates representing the golf course. The processing subsystem thus correlates the global earth position to the location on the golf course wherein the distance from the global earth position to the desired location is determined.

Preferably, the invention thus includes indication element, e.g., an LED or LCD display, for indicating the distance to a user of said system.

The invention also preferably incorporates a stationary differential GPS receiver/transmitter and a GPS receiver which is a differential GPS receiver. Such a differential GPS receiver receives and applies a correction signal from the stationary differential GPS receiver/transmitter which is arranged at a known global earth location geographically located with the golf course. The stationary GPS receiver/transmitter means operates in conjunction with the differential GPS receiver means and transmits the correction signal to the GPS receiver.

In certain aspects, the memory element also stores a second location of at least one object, e.g., a known hazard, on the golf course. The processor subsystem thus includes circuitry and programming to correlate the global earth position to the second location such that the distance between the global earth position and the second location is determined.

In another aspect of the invention, the processor subsystem includes a memory load subsystem which communicates coordinates representative of at least one location of the golf course to the memory element.

In still another aspect of the invention, a local memory storage element is included which stores coordinates representative of the golf course. The local memory storage element is generally provided at a stationary location, e.g., at the club house, so that users can load the coordinates of the current golf course into the inventive system. The memory load subsystem thus is adapted for selective communication with the local memory storage element wherein the memory load subsystem communicates the coordinates representative of the golf course to the memory element for storage in the memory element.

In yet another aspect according to the invention, there is provided a system for determining the distance to a hole on a golf course. The system includes (i) a GPS receiver arranged to receive a global earth position; and (ii) a processing subsystem, i.e., including a microprocessor, in communication with the GPS receiver. The processing subsystem includes a memory element for storing a location of at least one hole of the golf course, and a correlation processor for correlating the global earth position to the location, such that the distance from the global earth position to the location is determined.

In this way it can be seen that the invention provides golfers with a portable system for tracking position on a golf course. It also provides golfers with a convenient mechanism for logging relevant performance information while playing a round of golf and for reviewing that information at a later time. Furthermore, the invention provides golfers with accurate distance measurements to landmarks on a golf course.

BRIEF DESCRIPTION OF THE DRAWINGS

For a better understanding of the nature and objects of the invention, reference should be made to the following detailed description and the accompanying drawings, in which.

DETAILED DESCRIPTION

Figure 1:
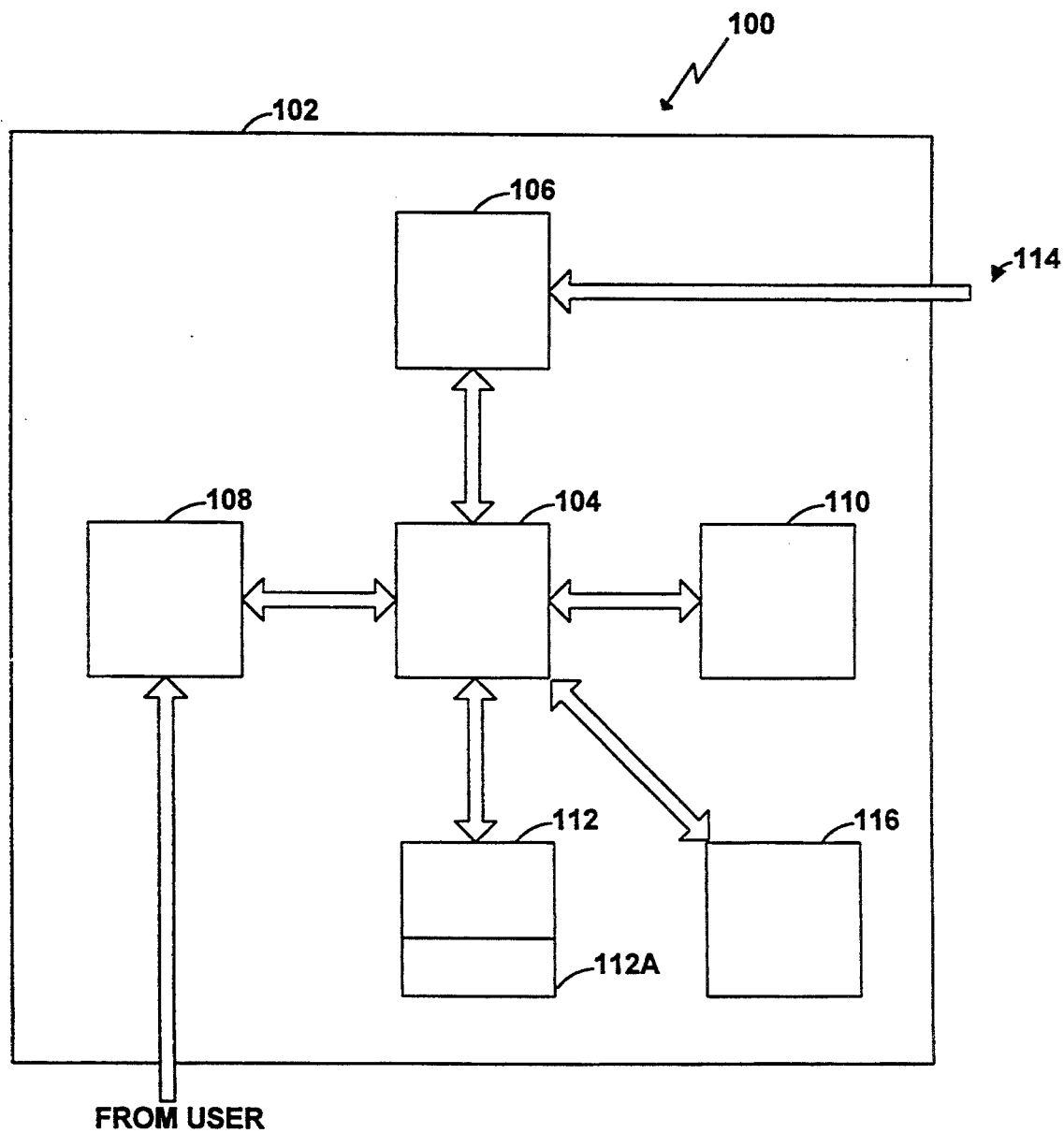
FIG. 1 shows a block diagram of a player positioning system according to one embodiment of the invention.

FIG. 1 shows a block diagram of a player positioning system 100 according to one embodiment of the invention. The illustrated embodiment 100 includes a mobile interface unit 102 that determines a player's position on a playing field from externally provided signals 114, and relays that positional information, along with other relevant information, to the player. According to a preferred embodiment, the unit 102 is kept in close proximity to the player, and includes a processor 104, position interface electronics 106, a user input interface 108, a display 110, and memory 112. The unit 102 can also optionally include an audio interface 116.

The position interface electronics 106 receives externally generated positional information signals 114. The signals 114 can come from a variety of sources, such as, for example, the Global Positioning System (GPS) satellite constellation, ground based microwave transmitters, electromechanical sensors, or ground based acoustic transducers, all of which are discussed in further detail below. Following initial processing of the signals 114, the interface electronics 106 then couples information gleaned from those signals to the processor 104.

The memory 112 can store, among other information, digitally encoded positional information, such as digitized maps, for one or more particular playing fields. According to one embodiment, a portion 112a of the memory 112 can be removed and replaced with digitized maps of a plurality of playing fields. In this way, the system can be easily adapted for use at a variety of locals. The processor 104 determines a player's position on the playing field by correlating the positional information signals provided by the interface electronics 106 with the digitized map information stored in the memory 112. Once the processor 104 determines the players position, it conveys that information to the player by way of the display 110, or optionally by way of the audio interface 116.

Quite often players desire additional information besides their position. One sport where players desire such additional information is golf. The user interface 108, which by way of example can be a keyboard, enables golfers to query the processor 104 as to distance and performance related information. For instance, according to one embodiment, a golfer can request the distance to a particular flag, or to a hazard, such as sand trap, pond or tree. According to a further embodiment, golfers can request information regarding the distance between any two of a plurality of landmarks, such as between the tee and the flag of a particular hole or the distance to the club house. The unit 102 provides the requested information by way of the display 110 or the audio interface 116.

Figure 2:
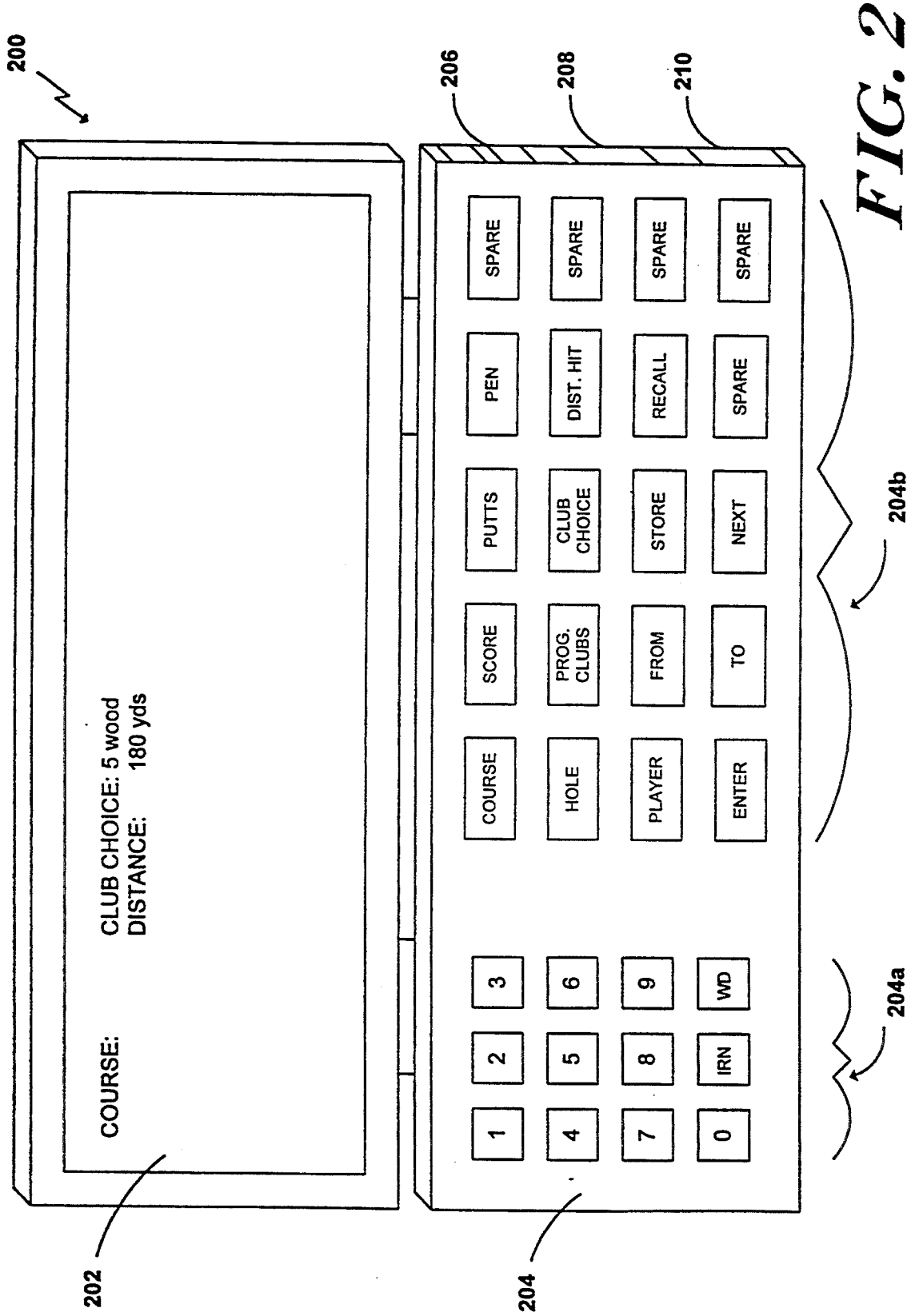
FIG. 2 depicts a mobile interface unit particularly adapted for operation on a golf course.

FIG. 2, depicts a mobile interface unit 200 of the type shown in FIG. 1, but particularly adapted for operation on a golf course. The unit 200 includes a display 202 and keyboard interface 204. The display 202 can display both graphics and alphanumeric characters. The keyboard 204 includes keys that can be generally grouped as numerical keys 204a and keys that can be grouped as command keys 204b. The unit 200 also includes an on-/off switch 206, a digital input/output interface 208 and a removable memory module 210.

During operation, a player can perform a variety of initialization procedures. First, the player can enter a numerical code which designates the particular golf course to be played. The golfer accomplishes this by actuating the "COURSE" command key followed by actuating the numerical keys corresponding to the desired course, followed by actuating the "ENTER" command key. In response, the processor 104 accesses the map for the selected course from the memory 112, and the display 200 shows the selected course code in the "COURSE:" field. According to alternative embodiments, the golfer can change the memory module 210 to provide the appropriate course map or can receive, through the interface 208, a signal from the club house that automatically sets the appropriate course selection code. The mobile unit can process externally generated position indicative signals received via the interface electronics 106 to automatically determine which particular golf course a golfer has selected to play. In response to that determination, the processor 104 can then access the digitilized map information stored in memory 112 for the particular golf course. The processor 104 can also signal the display 110 to display an identification code assigned with the particular golf course. According to a further embodiment, particular golf courses can provide mobile interface units 200 to the golfers, in which case the course can program the appropriate course map into the memory 112 before time. Where the golf course provides either the memory modules or the entire unit 200, up to date topography changes in the course can be incorporated into the digitized memory map. This can be easily accomplished via a central base computer such as that shown in FIG. 11 at 1000, located in the club house. Accordingly, in one embodiment, the, invention provides a centralized computer 1000, typically at the club house, for storing day-to-day course data.

The mobile unit 200 can accommodate a plurality of golfers (typically four in one preferred embodiment). Consequently, according to one embodiment, whenever taking advantage of any of the programming features of the unit 200, the golfer first actuates the "PLAYER" command key followed by a player code, e.g., 1, 2, 3, 4, etc.

One feature that the golfer can program into the memory 112 is the distance that he or she normally hits a golf ball with each club or with any subset of clubs. To enter the program clubs mode, the golfer actuates the "PROG. CLUBS" command key. Next, the golfer actuates the "CLUB CHOICE" command key, followed by the numerical designation of the club to be set followed by the "ENTER" command key. By way of example, to select the five wood, the golfer actuates the "WOOD" key, followed by the "5" key, followed by the "ENTER" key. In response, the display 202 indicates a "5 wood" in the "CLUB CHOICE:" field. Next, the golfer actuates the "DIST. HIT" command key followed by the numerical keys corresponding to the desired distance, followed by the "ENTER" key. The display 202 then shows the selected distance (e.g., 180 yds.) in the "DISTANCE:" field. To program distances for additional clubs, the golfer repeats the above sequence of commands, or alternatively, to program the next club in sequence, the golfer can actuate the "NEXT" command key. To exit this mode of operation, the golfer simply actuates the "PROG. CLUBS" command key a second time. If a golfer chooses not to program club distances, the unit 200 can use a default set of parameters, e.g., a five iron for a 150 yard shot etc. Using the above described procedure, a golfer can alter any or all of the default distance parameters.

Figure 3:
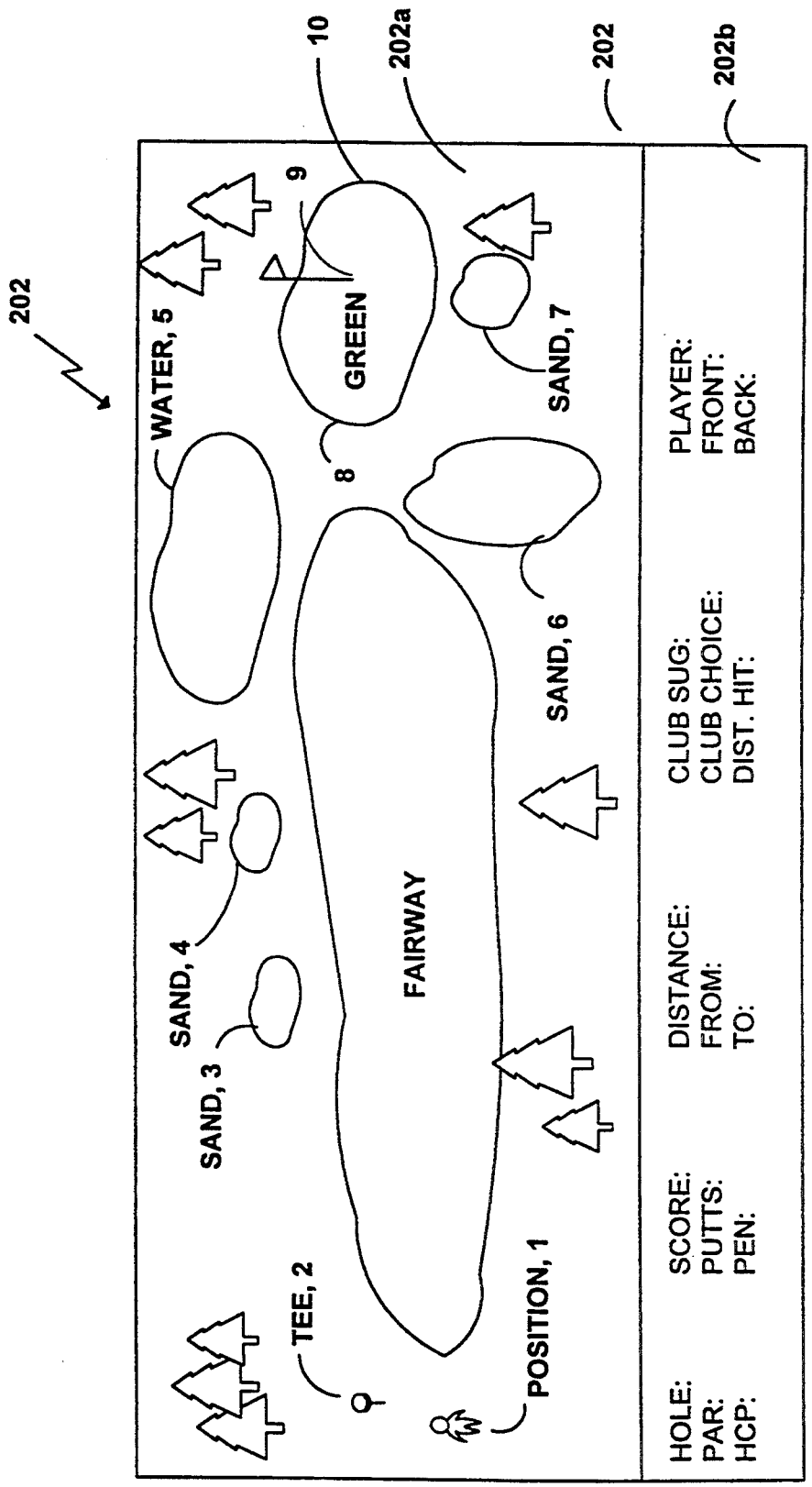
FIG. 3 shows one preferred embodiment of the display portion of the mobile interface unit of FIG. 2.

FIG. 3 shows the display 202, according to one embodiment of the invention and for one exemplary hole. As can be seen, the display 202 includes a graphical display portion 202a and an alphanumeric display portion 202b. Once the course selection has been programmed and any desired initialization has been performed, the unit 200 is ready for use. Prior to teeing off, the golfer can select the hole to be played. This is accomplished by actuating the "HOLE" command key followed by actuating the numerical designation for the hole (e.g., 01, 02, . . . , 18), followed by actuating the "ENTER" command key. In response, the display 202b indicates the designation for the selected hole in the "HOLE:" field. Alternatively, as a golfer approaches the tee for a particular hole, the unit 200 can receive a signal, via the interface 114, that automatically programs the hole to be played. Additionally, in response to receiving the hole designation, the processor 104 accesses map information stored in memory 112 and transmits this information to the display 200. The display 200 provides a graphical representation of the selected hole in field 202a. As can be seen from the illustrative hole shown in field 202a, all significant features of the hole being played, including the tee 2, the green 8 and various landmarks and hazards 3 through 7 can be displayed. Additionally, the processor correlates the position information provided by the position interface electronics 106 with the map information provided by the memory 112 to determine the position of the mobile unit 200 on the golf course. The golfer's position is illustrated on the display 202a by the character at 1. The processor also accesses other relevant information regarding the hole being played from the memory 112 and automatically displays that information in the display portion 202b. Such information includes par, handicap, and distance from the tee to the flag for the hole. This information is displayed in the "PAR:", "HDCP:", AND "DISTANCE:" fields, respectively. Just prior to playing the hole, the golfers select which golfer is about to play. That golfer's code, e.g., 1, 2, 3, 4, etc. appears in the "PLAYER:" field.

As the golfer plays each hole, the mobile unit 200 can provide considerable information. For example, according to one preferred embodiment, the unit 200 automatically displays the distance from the mobile unit 200 to the flag. By request, the unit 200 can also provide a golfer with the distance from the mobile unit 200 to any of the landmarks shown in the graphical display 202a. To determine such distances, the golfer actuates the "TO" command key, followed by the numerical designation for the landmark. In response, the unit 200 displays the landmark designation in the "TO:" field and the requested distance in the "DISTANCE:" field of display 202a. According to a further embodiment, the unit 200 can also provide a golfer with the distance between any two of the landmarks shown in the graphical display 202a. To determine such distances, the golfer actuates the "FROM" command key, followed by the numerical reference designation of the first landmark of interest. In response, the display 202b indicates the selected reference designation in the "FROM:" field. Next, the golfer actuates the "TO" command key followed by the numerical reference designation for the second landmark of interest. In response, the display 202b shows that reference designation in the "TO:" field. The processor 104 then accesses the map information in the memory 112, calculates the distance between the two selected reference designations, and couples the calculated distance to the display 202b. The display 202b then indicates this distance information to the golfer in the "DISTANCE:" field. To reenter the mode of automatically displaying the distance between the mobile unit 200 and the flag 9, the golfer simply actuates the "TO" command key, followed by the reference designation "1."

Alternative to the above description, the display 202a can show the distance to each hazard or other object automatically by overlying the distance information from the player to each reference on the display and at the location of each hazard or object.

The processor can also automatically accesses the club distance information (either the default parameters or those previously programmed by the golfer, as may be appropriate) and display a club suggestion for each shot. The display 202b indicates the club suggestion for each shot in the "CLUB SUG:" field. The golfer can also enter his or her actual club choice by actuating the "CLUB CHOICE" command button, followed by the "ENTER BUTTON" followed by the "STORE" command key. The processor 104 displays the new club choice in the "CLUB CHOICE:" field in the display 202b. The golfer can also enter the distance that he or she hit the ball using that particular club choice. The distance hit is displayed in the "DIST. HIT" field. The processor automatically stores the displayed club choice, distance, course and hole information, and golfer position information for the particular hole. The processor 104 also uses this information to automatically update the golfers distance selection for the particular club selected. If the golfer repeats this procedure for each shot taken on the hole, a complete record of play on that hole will be stored. To recall this information at a later time, the golfer actuates the "RECALL" command key, and then specifies the course and hole of interest. To review successive shots, beginning at a particular hole, the golfer actuates the "NEXT" command key. In this way golfers can review their play on troublesome holes, and learn to avoid repeatedly making the same mistakes, such as incorrect club selection for particular shots.

Figure 11:
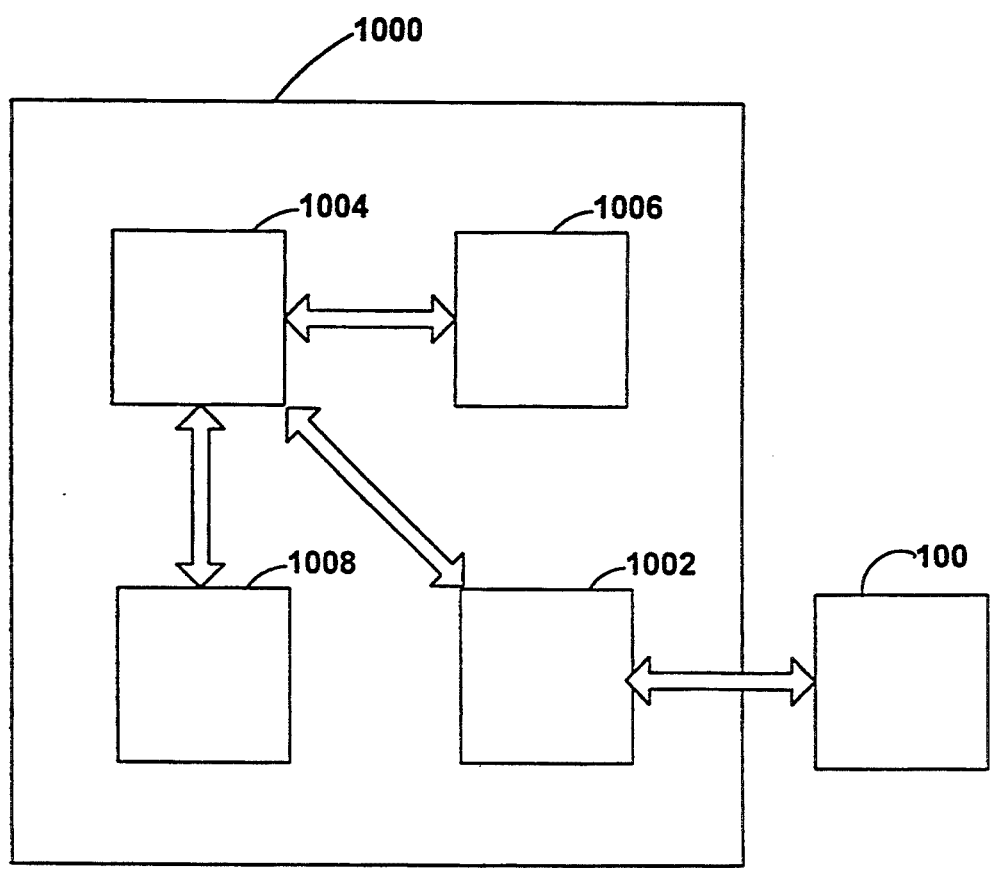
FIG. 11 shows a schematic block diagram of a central computer interfacing with the mobile interface unit of FIG. 1, in accord with the invention.

As shown in FIG. 11, optionally the golfer can down load information regarding the round of golf to the central computer located in the clubhouse. The central computer 100 can include an input/output interface 1002, a processor 1004, memory 1006, and a printer 1008. To down load information regarding a round of golf, the golfer simply provides the course operator with his removable memory module 210 or alternatively attaches the unit 200 to the central computer 1000 by way of input/output interface 1002 the serial interface 208. The central computer 1000 can access the memory module 210, store the data, and process the data in processor 1004, and print the data on printer 1008 in any number of formats, depending on the personal preference of the golfer.

The mobile unit 200 can also provide the golfer with a convenient system for keeping score. Following the completion of a hole, the golfer can actuate the "SCORE" command key followed by the score for that hole. The processor 104 updates the golfer's score and transmits the updated score to the display 202a. The display 202a in turn displays the score for the hole just played in the "SCORE:" field and also displays the updated total score in either the "BACK NINE:" or "FRONT NINE:" fields, as appropriate. The golfer can also enter any penalties for the hole by actuating the "PENALTY" command key. This will signal the processor to update the score for the hole accordingly. Additionally, the golfer can track how many putts were taken by actuating the "PUTTS" command key.

While the above description addresses various features of the present invention, those skilled in the art will appreciate that the description of the particular implementation of those features, such as the particular command keys included and their arrangement, along with the particular layout of display is illustrative in nature. By way of example, the display 202b depicts various information being displayed simultaneously. However, according to other embodiments within the scope of the invention, information can be displayed as a sequence of user interface dialogs, employing a tool bar and various menus, and being initiated by a golfer actuating a particular command key. Additionally, command keys can share various functions. In this way, the display can be made smaller, and the number of command keys can be reduced. Alternatively, as the golfer moves to different positions along a fairway, the display can be automatically updated to provide a more detailed display of the relevant area of play. Also, the alphanumeric display 202b can be integrated with the graphical display 202a, to further conserve on display space.

As in any electronic system, the information that can be conveniently received from and conveyed to a user is at least in part dependent on the size of the system and the power consumed by the system. Consequently, as the unit 200 is made larger, more of the above described features can be included and the display can be more detailed. According to one preferred embodiment, the mobile unit 200 can be mounted to a drivable golf cart. According to a further embodiment, the drivable golf cart can provide the power required by the unit 200, thus enabling the unit 200 to include a relatively detailed display 202 and a significant number of features such as described above. According to another embodiment, the unit 200 can be adapted to be either hand held or mounted to a pull-type golf cart. To provide for lower power consumption and convenience of size, the hand held and pull-type golf cart embodiments can be essentially paired down versions of the embodiment of FIG. 2. In the most paired down version, the unit simply provides the golfer with the distance from the mobile unit to the flag of the hole being played.

Figure 4:
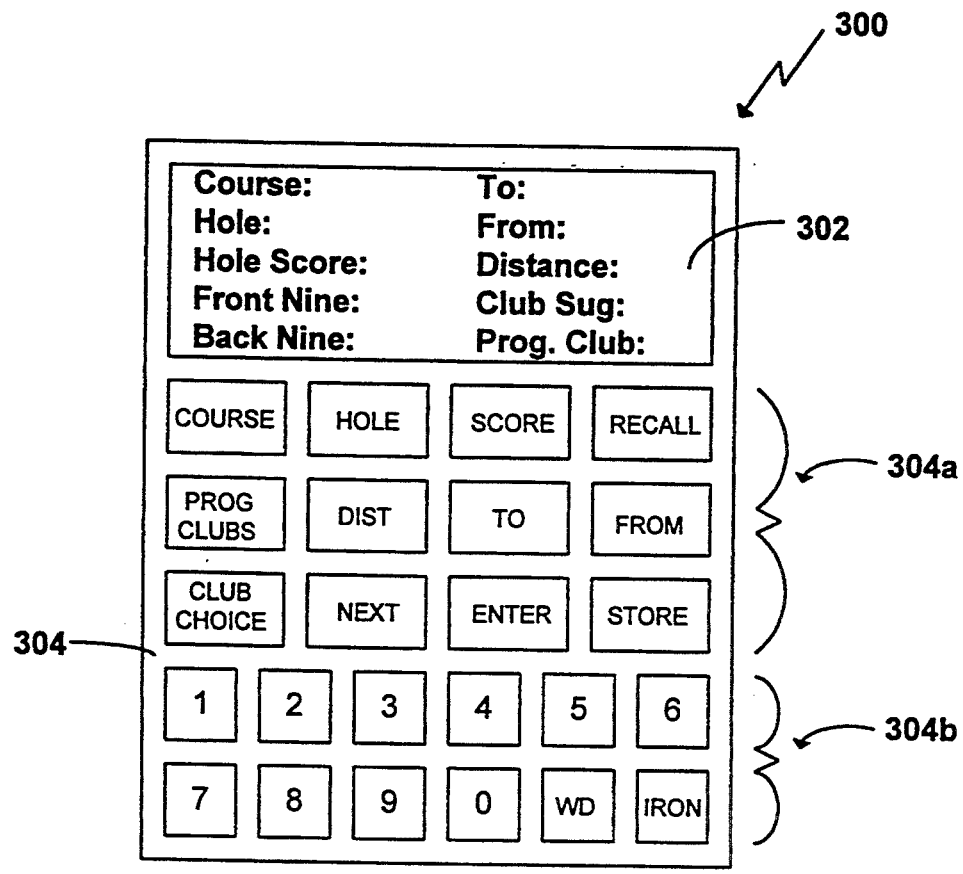
FIG. 4 shows an alternate embodiment of the mobile interface unit of FIG. 2.

For example, FIG. 4 shows a portable display unit 300, particularly adapted for operation as a hand held unit or for mounting on a pull-type golf cart. As can be seen, the unit 300 includes a display 302 and a keypad interface 304. Like the unit 200 of FIGS. 2 and 3, the keypad interface 302 includes command keys 304a and numeric keys 304b. According to the depicted embodiment, the display 302 only includes alpha-numeric capabilities. However, according to other embodiments, a small graphical display portion, such as those employed on hand held video games can be incorporated. In the case where a graphical display is used, the unit 300 operates essentially identically to unit 200 of FIGS. 2 and 3. In the event that no graphics capability is included, a small map can be included to provide the reference designations for the landmarks that are located along the golf course. Alternatively, the unit 300 can be programmed to only provide the distance between the mobile unit 300 and the flag for the hole being played.

Figure 4A:
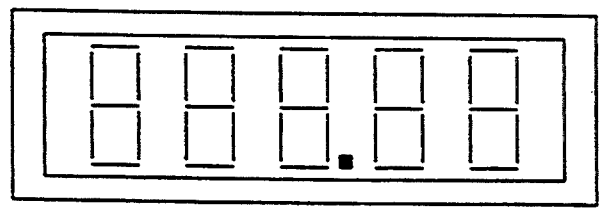
FIG. 4A shows an alternate embodiment of the display portion of the mobile interface unit of FIG. 4.

FIG. 4A illustrates one such embodiment which only provides the distance between the mobile unit 300 and the flag. According to the depicted embodiment, the display 302 is an LED or LCD display, such as those well known in the art. LED and LCD displays can be advantageous due to their small size, low power consumption and low cost.

As mentioned above, the positional information that the mobile unit processes to provide distance and other related information to a player can be derived from a variety of sources. By way of example, such sources can include the Global Positioning System (GPS) satellite constellation, ground based microwave transmitters and receivers, electromechanical sensors operating in combination with a gyroscope, compass, and/or ground based acoustic transducers.

The GPS comprises a 21 NAVSTAR satellite constellation orbiting at 20,180 kilometers above the earth. These satellites provide real-time navigation and positioning information to anyone on earth with a GPS receiver. The operation of the GPS is conceptually straight forward. Each GPS satellite transmits a microwave radio signal that details the satellite identification number, its internal atomic clock, and the orbital location of the satellite (which is acquired through radar tracking). The elapsed time between the signal transmission, which is calibrated to an on-board atomic clock (typically either rubidium or cesium frequency standards), and the receipt at the ground-based GPS receiver, which has its own internal clock and antenna, divided by the speed of light, is roughly, the distance to one satellite. By computing the distance from each of three satellites, a triangulation is effected which enables the ground-based GPS receiver to determine its own position on the earth's surface. By computing the distance to each of four or more satellites, the ground-based receiver can determine its position in three dimensions, including height.

GPS receivers are available from a variety of manufacturers. By way of example, the GPS NAV 100 and the TRAXXAR 6 channel GPS are available from Motorola and Magellan, respectively. Typically, these receivers have location accuracies in the range of 25 meters. However, for greater accuracy, users can turn to differential GPS, commonly denoted as DGPS. DGPS is widely used. For example, the US. Coast Guard has initiated several reference stations around US. Coastal waters to provide DGPS to U.S. harbors. Likewise, the Federal Aviation Administration has installed advanced DGPS equipment at some airports to replace the older radio beacons and to improve location accuracy to approximately one foot.

Operationally, DGPS requires a local "master" GPS receiver which is positioned at a known location and linked to a transmitter, and a "slave" GPS receiver, which can be mobile. The master and the slave are linked together, for example, by a local UHF or VHF radio link. The master GPS receiver determines its coordinates from the GPS constellation, calculates a correction factor, and then transmits the correction signal to any slave in an extended geographical region about the master via the local radio link. The slave processes the correction signal along with its own GPS-determined coordinates and determines the slave location at a significantly improved accuracy over normal GPS receivers. Ideally, the master GPS receiver/transmitter is located on slightly elevated ground relative to the slave units to reduce multipath interference. An example of a portable DGPS unit is the Motorola LGT 1000 TM Lightweight GPS/GIS terminal which has a probable location accuracy of 1–5 meters. Conveniently, two LGT 1000 TM systems operate to form a DGPS. One functions as the master and requires continuous operation power consumption at its external connector and one serves as the slave GPS and employs an internal battery. The accuracy of DGPS can be further improved by time integration. By way of example, to generate real-time information at approximately 1 Hz, the accuracy for present DGPS is approximately 1 meter.

Figure 5:
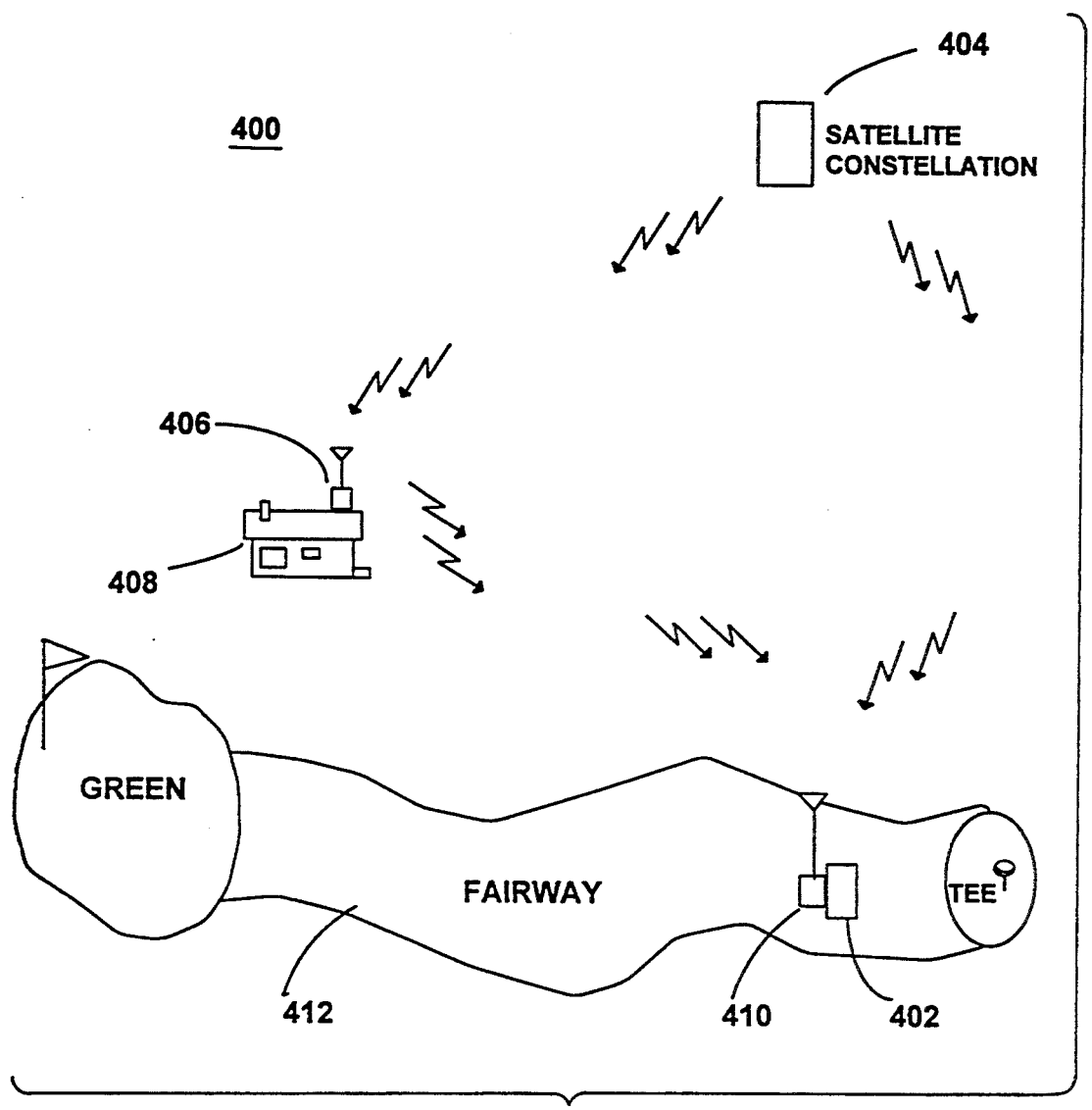
FIG. 5 is a schematic illustration depicting one embodiment of the positioning system of FIG. 1, adapted for receiving positional information from Global Positioning System satellites.

FIG. 5 depicts a system 400 according to the invention which includes a mobile interface unit 402, similar to the unit 102 of FIG. 1, that is adapted for operation with the GPS satellite constellation 404. Also shown is the master GPS 406, which can be located at the clubhouse 408. Thus, in this embodiment, the slave GPS unit 410 becomes the position interface electronics 106 of FIG. 1 for the mobile interface unit 402. As the mobile interface unit 402 traverses the exemplary hole 412, the slave unit 410 receives transmissions from the constellation 404 and the master unit 406 to provide the mobile unit 402 with real-time, high accuracy positional information.

Figure 6:
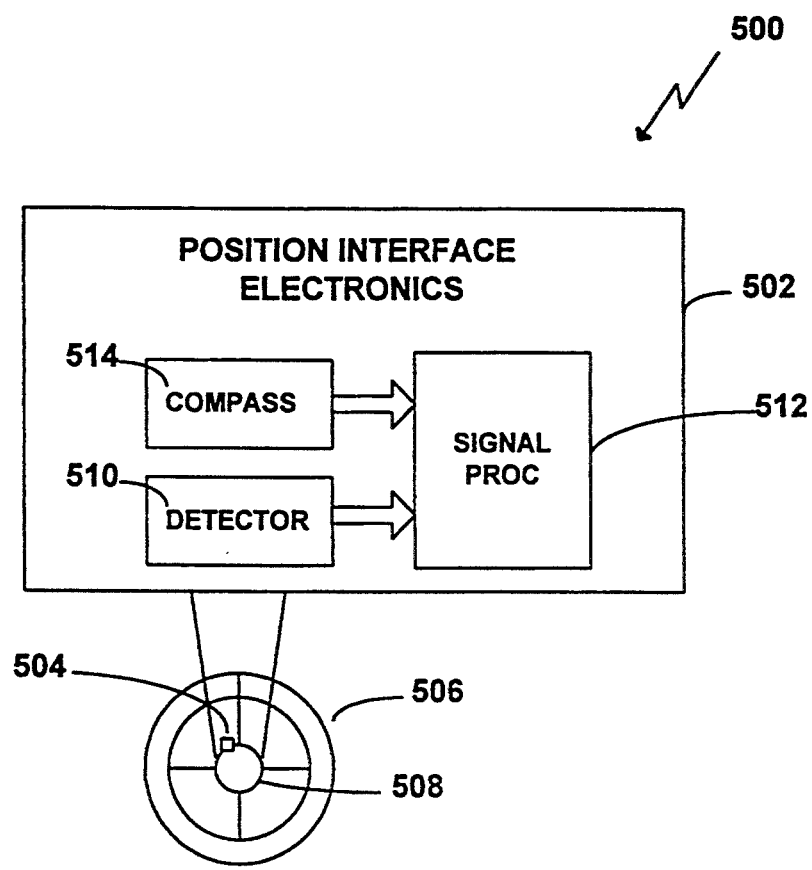
FIG. 6 is a diagram depicting one embodiment of the position interface electronics of FIG. 1, adapted for receiving positional information from a sensor mounted to the wheel of a golf cart.
Figure 7:
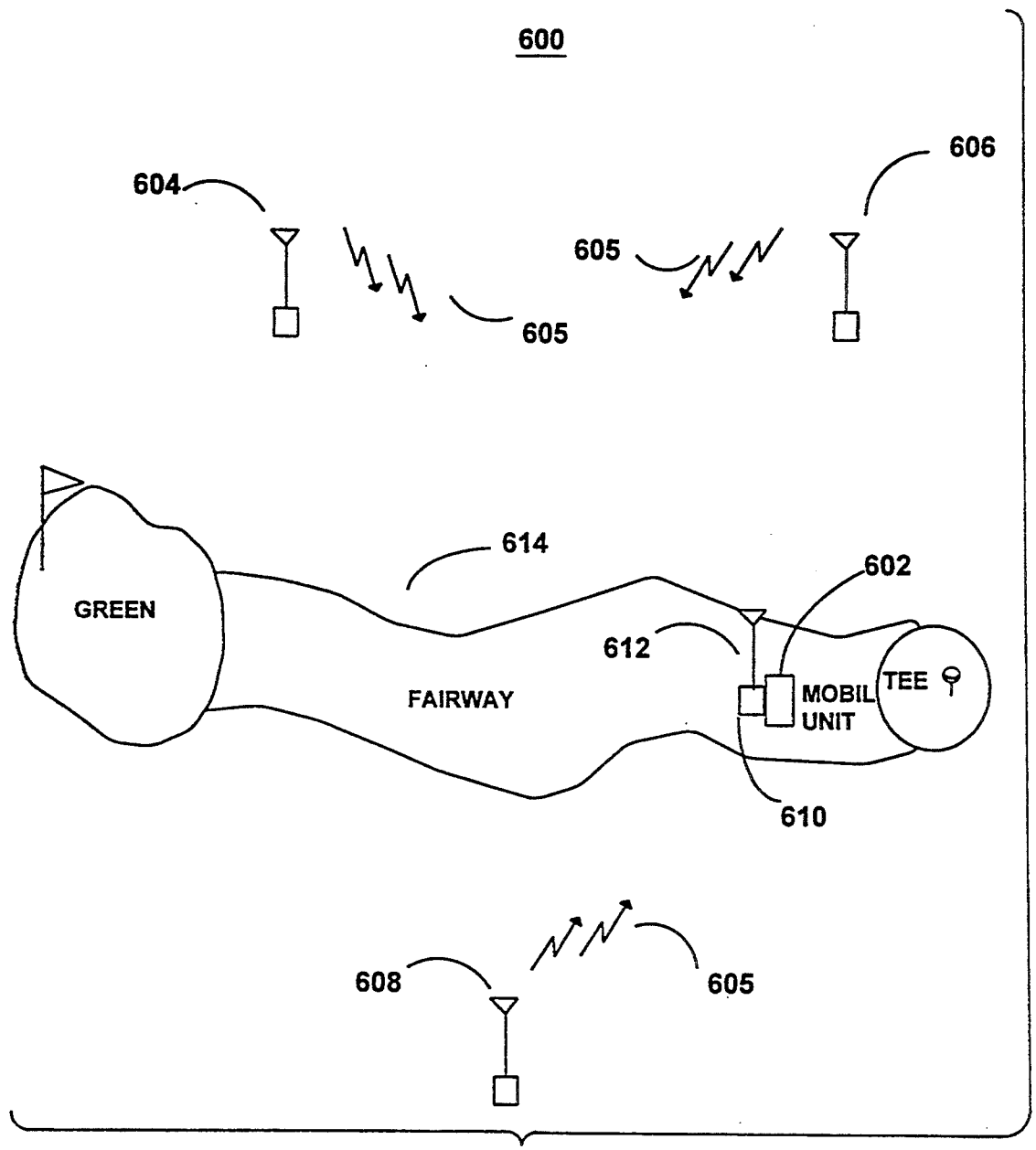
FIG. 7 is a diagram illustrating one embodiment of the positioning system of FIG. 1, adapted for receiving positional information from a plurality of ground based transmitters.

FIG. 6 is a schematic block diagram 500 of an alternate embodiment of the invention, wherein the position interface electronics 502 is adapted to process a signal from an electro-mechanical sensor 504 coupled to a wheel 506 of either a drivable or pull-type golf cart. As shown, the sensor can be coupled to the shaft 508 of the wheel 506. However, depending on the particular device employed, the sensor 504 can be coupled to the spokes or even the hub of wheel 506. According to one preferred embodiment, the sensor 504 is a light emitting device which couples a beam of light to the detector 510 each time the wheel 506 rotates. According to another embodiment, the device 504 can be a shaft encoder or an automobile type odometer. The detector 510 couples a digital signal, representative of one wheel revolution to the processor 512. Additionally, the compass 514 provides the processor 512 with information indicative of the direction of the golf cart or pull cart. The processor 512 uses the information from the compass 514 and the detector 510 to determine the distance traveled and the direction in which that distance has been traveled. As long as the mobile interface unit is reset, either manually or automatically, at each hole, i.e., a vector, the embodiment of FIG. 6 provides accurate positional information to the flag FIG. 7 depicts a system 600 according to the invention and including a mobile interface unit 602, adapted for operation with a plurality of ground-based transmitters 604, 606, and 608. The mobile interface unit 602 includes the position interface electronics 610, which is similar to the electronics 106 of FIG. 1. The position interface electronics 610 can receive and process signals 605 the antennas 604, 606, 608 as the mobile interface unit 602 traverses the hole 614. According to one embodiment, antennas 604, 606, 608 are phased array microwave antennas and the interface electronics can measure the phase difference between signals received via antenna 612 to determine the position of the mobile unit 610. According to a further embodiment of system 600, the interface electronics 610 processes the amplitude differences between the signals received from antennas 604, 606, 608 to determine the position of the mobile unit 602.

Figure 8:
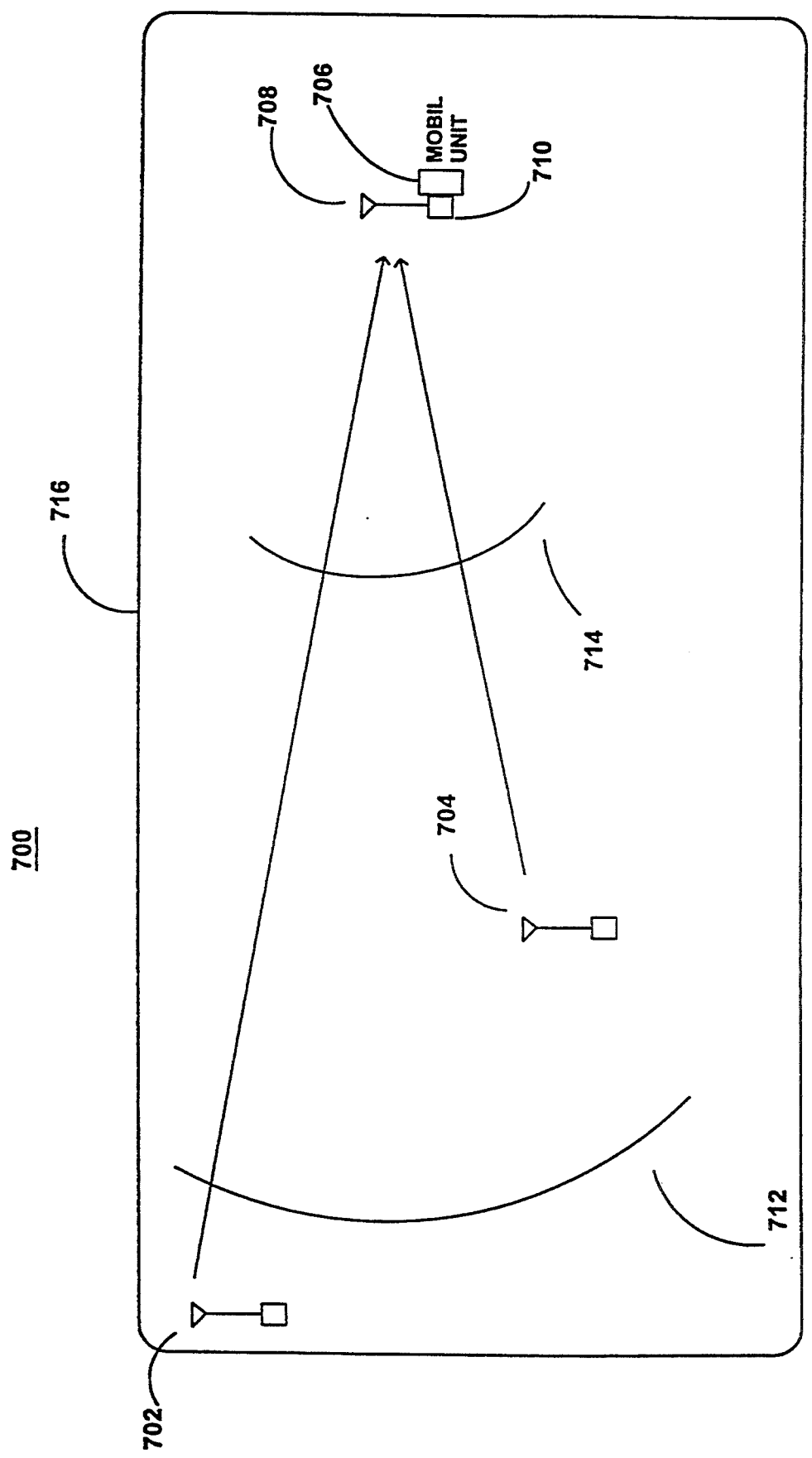
FIG. 8 is a diagram illustrating one embodiment of the positioning system of FIG. 1, adapted for receiving positional information from two ground based transmitters.

While the system of FIG. 7 is depicted with three transmitting antennas 604, 606, 608, two transmitting antennas can be employed with virtually identical results. More particularly, FIG. 8 shows a diagram of a system 700 which illustrates the use of two transmitting antennas 702 and 704 to provide positional information to the position interface electronics 710 of the mobile interface unit 706. The system is depicted on an exemplary golf course 716. With only two antennas 702 and 704 to provide positional information, there are two possible solutions for the position of the mobile unit 706. However, the antennas 702 and 704 can be arranged such that one solution typically will fall outside the boundary for the hole being played. As in the case of the system of FIG. 6, the mobile unit 706 can process either phase or amplitude information from the antennas 702 and 704 to determine its position.

According to a further embodiment of the invention, the mobile interface unit can process acoustic data to determine its position on a playing field. Since sound travels at a known speed in atmosphere (340 meters/second), it can be used like any other ranging system. Additionally, since sound travels at a much slower rate than does radio frequency or microwave frequency signals, the complexity of the electronics is greatly reduced. The transmitted sound can be non-audible so as not to disturb the quiet at the golf course.

Figure 9:
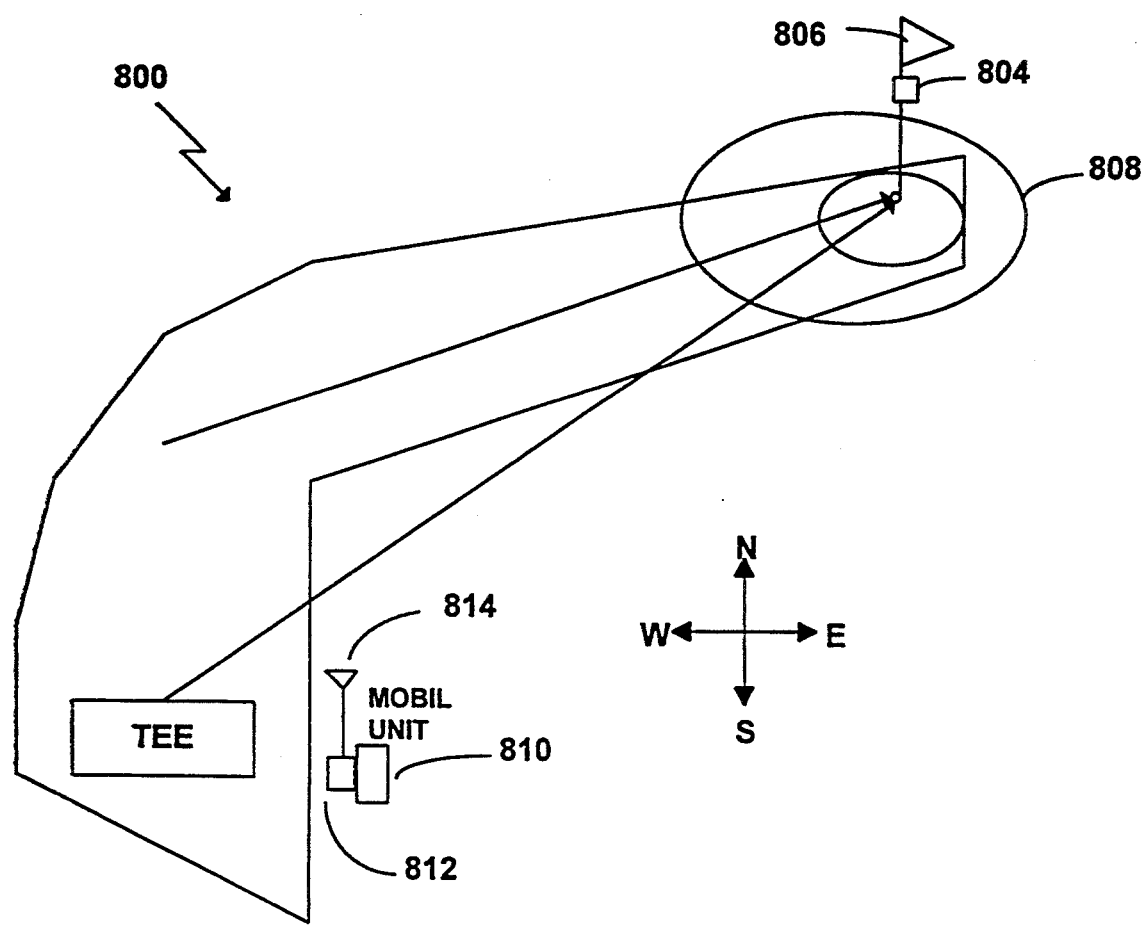
FIG. 9 is a diagram illustrating one embodiment of the positioning system of FIG. 1, adapted for receiving positional information from a plurality of ground based acoustic transducers.

FIG. 9 shows a schematic diagram of a representative hole 800 which illustrates the operation of a mobile interface unit 810 according to the invention and adapted for determining position from acoustic data. An acoustic sound generator 804 is located at the flag 806. The generator 806 provides periodic acoustic energy pulses illustrated by sound waves 808. The position interface electronics 812 receive the acoustic energy pulses by way of the acoustic transducer 814, e.g. a microphone.

Figure 10:
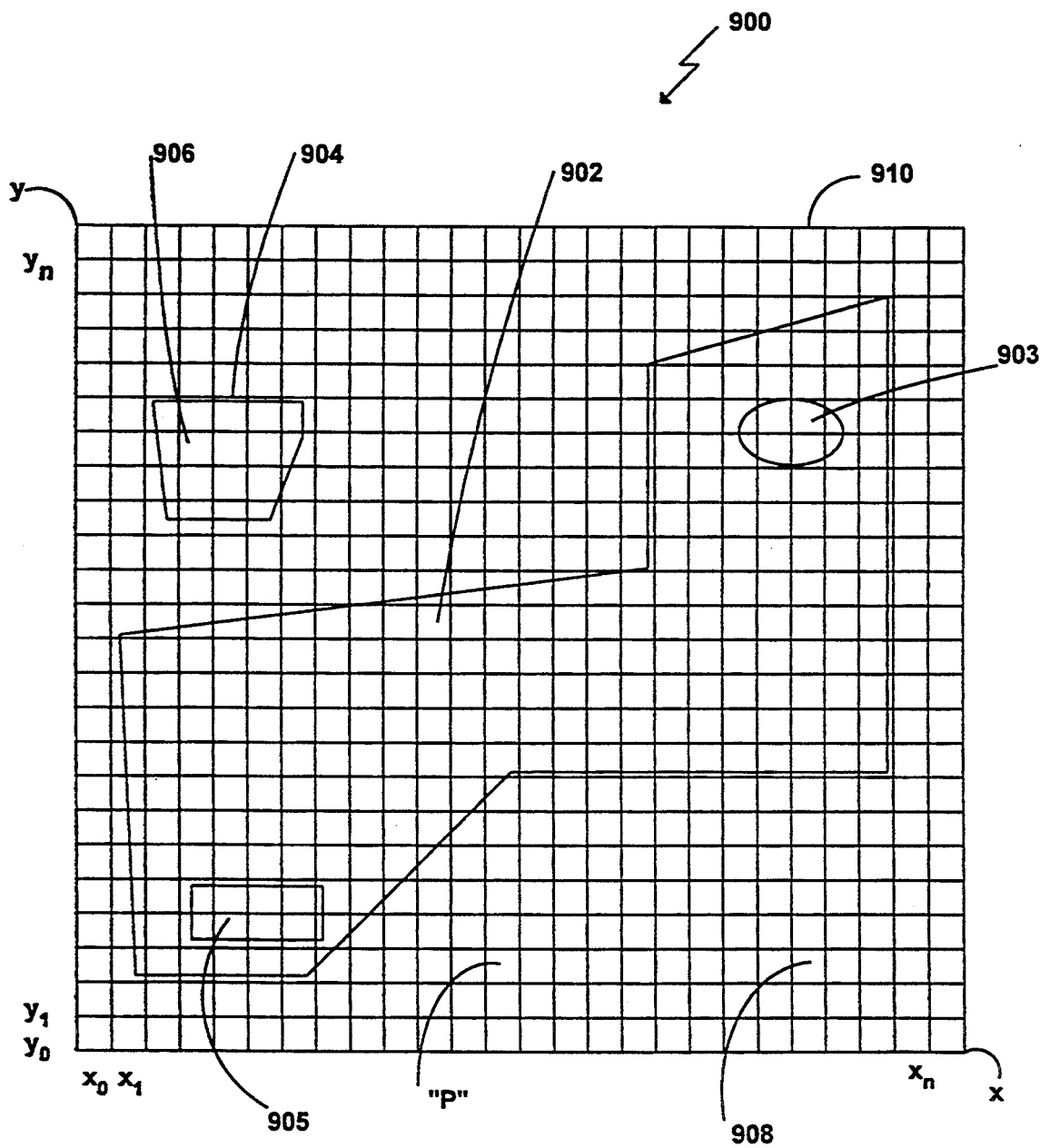
FIG. 10 illustrates one method of digitizing a playing field for storage in the memory unit of FIG. 1.

As discussed above, according to the invention, map information for various golf courses can be stored in the memory 112 of FIG. 1. One method of storing of map information is to create a cartesian coordinate grid 910 of the golf course. The grid 910 has an x-coordinate and a y-coordinate. FIG. 10 exemplifies a cartesian coordinate mapping according to one embodiment of the invention for a typical hole 900. The hole 900 includes a fairway 902, a green 903, a clubhouse 904, tee-off location 905, and first and second reference locations 906 and 908, respectively.

The hole 900 can be mapped into the coordinate grid 910 by any of a variety of methods. By way of example, the golf course can be arially scanned. According to one arial scanning method, an airplane flies over the golf course and employs a device such as a charge coupled device (CCD) scanner to scan the ground scene. The CCD scanner is comprised of an array of CCD elements. Typically, the CCD scanner extends transverse to the travel of the airplane. Thus, as the airplane travels along the direction of travel (e.g., along the "y" axis), an electronic slice of the course is created. Each CCD element acquires one pixel "P" image of the golf course. As shown in FIG. 10, at y-coordinate y1 a first slice is taken traversing from x0 through xn. At y-coordinate y2 a second slice is taken, once again traversing from x0 through xn. This continues until similar scans are performed for coordinates y0 through yn. With the full image of the hole 900 electronically scanned, it can be stored in memory 112 and access by x- and y-coordinates. In an alternative embodiment, the hole 900 can be arially photographed and then the photograph can be digitally scanned into the memory 112. Regardless of whether the hole 900 is scanned directly or a photograph or other rendition of the hole is scanned, the resolution of the stored image is directly proportional to the number of coordinate grids 908. Thus, the more data points stored, the more precise the measurements which the positioning system 100 can perform.

As shown in FIG. 10, two reference locations of known longitude and latitude can be selected on the golf course. For example, one know location can be location 906 at the clubhouse 904. Another known location can be some other arbitrary point 908. With the resolution of the grid 910 known, the known points 906 and 908 can be used to map all other x-and y-coordinate locations to longitude and latitude locations. In this way, when the position interface electronics receives longitude and latitude information from the GPS constellation, for example, the processor 104 can combine the received information with the coordinate information stored in the memory 112 to determine the position of the mobile interface unit 200 on the golf course 900.

It is accordingly intended that all matter contained in the above description or shown in the accompanying drawings be interpreted as illustrative rather than in a limiting sense.

It is also intended that the following claims cover all of the generic and specific features of the invention as described herein, and all statements of the scope of the invention which, as a matter of language, might be said to fall there between.

Having described the invention, what is claimed as new and secured by Letters Patent is:

1. A portable distance tracking system for use by a golfer on a golf course, wherein said golf course includes at least a first land mark, and wherein said system comprises at least one mobile interface unit including:

A. a memory element including means for storing digitized map representations of a plurality of golf courses;

B. position interface electronics including a first GPS receiver for receiving position indicative signals from a Global Positioning System satellite constellation located in orbit around the Earth, wherein said position indicative signals are representative of a geographical location of said mobile interface unit;

C. a data processor, coupled to said memory element and to said position interface electronics, and including means for processing said position indicative signals to determine said geographical location of said mobile interface unit, means for corresponding said geographical location of said mobile interface unit with said digitized map representations to automatically identify a particular golf course that a golfer has selected to play means for corresponding said geographical location of said mobile interface unit with said digitized map representation of said particular golf course to determine a field location of said mobile interface unit on said particular golf course, and means for determining a distance between said mobile interface unit and said first landmark; and D. a player interface, coupled to said data processor, and including means for communicating at least said distance between said mobile interface unit and said first landmark to said player.

2. A portable distance tracking system according to claim 1 wherein said system further comprises a GPS master unit, wherein said GPS master unit is positioned at a fixed location having known longitude and latitude coordinates and includes:

A. a second GPS receiver for receiving said position indicative signals from said Global Positioning System satellite constellation, and a GPS processor having means for processing said position indicative signals to determine a calculated longitude and a calculated latitude for said fixed location of said GPS master unit, and B. wireless transmission means for transmitting an error correction signal to said mobile interface unit, wherein said error correction signal is based at least in part on a difference between said known longitude and latitude and said calculated longitude and latitude, and wherein said position interface electronics includes wireless reception means for receiving said error correction signal from said GPS master unit, and said first GPS processor includes means for processing said error correction signal with said position indicative signals to determine a corrected geographical position of said mobile interface unit.

3. A portable tracking system according to claim 1 wherein said memory element includes a replaceable portion, for storing said digitized map representations of said plurality of golf courses.

4. A portable distance tracking system according to claim 1 wherein said mobile interface unit further comprises a keyboard interface coupled to said data processor and including means for entering commands and data into said mobile interface unit.

5. A portable distance tracking system according to claim 1 wherein said player interface includes a visual display including means for displaying information to a player.

6. A portable distance tracking system according to claims 1 wherein said player interface includes an audio interface for communicating information to a player.

7. A portable distance tracking system according to claim 1 wherein said data processor includes means for corresponding said geographical location of said mobile interface unit with said digitized map representation of said particular golf course to automatically identify which particular hole on said particular golf course said golfer has selected to play.

8. A portable distance tracking system according to claim 1 wherein said interface further comprises a keyboard interface coupled to said data processor and including means for entering commands and data into said mobile interface unit, and a visual display interface having means for displaying entered commands and data.

9. A portable distance tracking system according to claims 8 wherein said keyboard interface includes means for selecting a particular hole on said particular golf course to be played by signaling said data processor to access a portion of said digitized map representation for said particular golf course from memory element.

10. A portable distance tracking system according to claim 8 wherein said keyboard interface includes means for selecting a particular hole to be played on said golf course.

11. A portable distance tracking system according to claim 8 wherein said display includes means for displaying a par score associated with a selected hole to be played on said golf course.

12. A portable distance tracking system according to claim 8 wherein said display includes means for displaying a handicap associated with a selected hole to be played on said golf course.

13. A portable distance tracking system according to claim 8 wherein a particular hole has an associated flag location, said landmark is said associated flag location, and said display includes for displaying a distance between said mobile interface unit and said first landmark.

14. A portable distance tracking system according to claim 8 wherein a particular hole has a plurality of associated landmarks and said display includes means for displaying a distance between said mobile interface unit and one or more of said landmarks.

15. A portable distance tracking system according to claim 14 wherein said keyboard includes means for signaling said display to display a distance between said mobile interface unit and one or more of said landmarks.

16. A portable distance tracking system according to claim 8 wherein said display includes means for displaying a graphical representation of a particular hole selected to be played on said golf course.

17. A portable distance tracking system according to claim 16 wherein said particular hole has a plurality of associated landmarks and said graphical representation shows said location of said mobile interface unit in relation to one or more of said landmarks, and said mobile interface unit includes means for displaying a distance between said mobile interface unit and one or more of said landmarks.

18. A portable distance tracking system according to claim 8 wherein said system includes means for processing said position indicative signals to automatically determine which particular hole on said particular golf course a golfer has selected to play, and said display includes means for displaying a graphical representation of at least a portion of said particular hole.

19. A portable distance tracking system according to claim 8 wherein said system includes means for dynamically updating said displayed portion of said particular hole in dependence on said field location of said mobile interface unit.

20. A portable distance tracking system according to claim 8 wherein said memory includes means for storing nominal distance assignments for golf clubs, wherein said assignments are representative of how far a golfer nominally hits a golf ball with a particular golf club, and said keyboard interface includes means for enabling a player to signal said data processor to modify one or more of said nominal distance assignments.

21. A portable distance tracking system according to claim 20 wherein said data processor includes means for determining a suggested golf club selection based at least in part on said distance assignments and said distance between said mobile interface unit and said first landmark, and said display includes means for displaying said suggested golf club selection.

22. A portable distance tracking system according to claim 21 wherein said keyboard includes means for overriding said suggested golf club selection by entering an alternative golf club choice.

23. A portable distance tracking system according to claim 22 wherein said data processor includes means for automatically updating said nominal distance assignments, based at least in part on said entering said alternative golf club choice.

24. A portable distance tracking system according to claim 21 wherein said keyboard includes means for entering an actual distance that said golfer hit with said suggested golf club selection.

25. A portable distance tracking system according to claim 24 wherein said data processor includes means for automatically updating said nominal distance assignments, based at least in part on said entering said actual distance.

26. A portable distance tracking system according to claim 8 wherein said particular golf course includes a plurality of holes to be played and said keyboard includes means for entering a hole score achieved by a golfer on said holes, said display includes means for displaying at least one of said hole scores at any particular time, said memory element includes means for storing said hole scores, and said processor element includes means for tallying said hole scores to determine a current total score equal to the sum of the scores of all holes thus far played.

27. A portable distance tracking system according to claim 8 wherein said keyboard includes means for entering number of putts taken on each of said holes and said memory element includes means for storing said number of putts.

28. A portable distance tracking system according to claim 8 wherein said keyboard includes means for selecting a particular number of golfers to share said mobile interface unit, said data processor includes means for associating an identification code with each of said number of golfers, and said display includes means for displaying at least one of said identification codes at any particular time.

29. A portable distance tracking system according to claim 8 wherein said memory includes means for storing information regarding at least one round of golf on said particular golf course, said keyboard includes means for signaling said processor to recall said information from said memory, and said display includes mean for displaying said information, wherein said information includes at least one of total score, score on particular holes, clubs selected for particular shots, penalties taken on particular holes, putts taken on particular holes, and distances hit with particular golf clubs.

30. A portable distance tracking system according to claim 8 wherein said mobile interface unit includes a communications interface having means for transferring digital information to and from said memory, wherein said system further includes a central computer including means for interfacing with said communication interface to transfer digital information between said mobile interface unit and said central computer.

31. A portable distance tracking system according to claim 30 wherein said central computer includes means for updating said digitized map information stored in said mobile interface unit memory to reflect current golf course conditions.

32. A portable distance tracking system according to claim 30 wherein said mobile interface unit memory includes means for storing information regarding at least one round of golf on said golf course, said keyboard includes means for signaling said processor to recall said information from said memory, and said display includes means for displaying said information, wherein said information includes at least one of total score, score on particular holes, clubs selected for particular shots, penalties taken on particular holes, putts taken on particular holes, and distances hit with particular golf clubs, and said central computer includes means for downloading said information, means for processing said information, means for storing said information, and means for printing said information in at least one of processed or unprocessed form.

33. A system for determining the distance between a first location and a second location on a particular hole on a golf course, comprising:
(A) GPS receiver means, positioned at said first location, for receiving a global earth position of said first location;
(B) a memory element having means for storing digitized map representations of a plurality of holes on a golf course; and
(C) processing means in communication with said GPS receiver means, comprising
  i) means for correlating said global earth position with said digitized map representations to automatically identify said particular hole on said golf course, and
  ii) means for correlating said first location to said second location to determine from said first location to said location.

34. A system according to claim 33 further comprising indication means for indicating said distance to a user of said system.

35. A system according to claim 34 wherein said indication means is a liquid crystal display.

36. A system according to claim 33 wherein said GPS receiver means is a differential GPS receiver having means for receiving and applying a correction signal, and further comprising stationary differential GPS receiver/transmitter means for operating in conjunction with, and transmitting said correction signal to, said differential GPS receiver means and being positioned at a known global earth location geographically located with respect to said golf course.

37. A system according to claim 33 wherein said processing means further comprises memory load means for communicating coordinates representative of at least one location of said golf course to said memory means.

38. A system according to claim 37 further comprising local memory storage means for storing coordinates representative of said golf course, said memory load means being in selective communication with said local memory storage means wherein said memory load means communicates said coordinates representative of said golf course to said memory means for storage in said memory means.

39. A system according to claim 33 wherein said memory element includes means for storing digitized map representations of a plurality of golf courses and said system includes means for correlating said global earth position with said digitized map representations of said plurality of golf courses to automatically identify a particular golf course that a golfer has selected to play.

40. A system according to claim 33 wherein said system includes a visual display for displaying at least a portion of a particular hole that a golfer has selected to play on said particular golf course, and means for dynamically updating said displayed portion of said particular hole in dependence on said first location.

41. A method for determining the distance between a first location and a second location on a particular hole on a golf course, comprising:
  (A) receiving a global earth position at a mobile interface unit at a first location from a GPS constellation;
  (B) storing in said mobile interface unit digitized map representations of a plurality of holes on a golf course; and
  (C) processing in said mobile interface unit said global earth position and said digitized map representations by
    i) correlating said global earth position with said digitized map representations to automatically identify said particular hole on said golf course, and
    ii) correlating said first location to said second location to determine the distance from said first location to said second location.

42. A method according to claim 41 comprising the further steps of
  (A) storing digitized map representations of a plurality of golf courses; and
  (B) correlating said global earth position with said digitized map representations of said plurality of golf courses to automatically identify a particular golf course that said golfer has selected to play.

43. A method according to claim 41 comprising the further steps of
  (A) displaying at said mobile interface unit a representation of at least a portion of said particular hole; and
  (B) dynamically updating said portion of said particular hole being displayed in dependence on changing said first location of said mobile interface unit.

* * * * *

UNITED STATES PATENT AND TRADEMARK OFFICE
CERTIFICATE OF CORRECTION

| | | |
|---|---|---|
| PATENT NO. | : 5,438,518 C1 | Page 1 of 1 |
| APPLICATION NO. | : 90/010326 | |
| DATED | : January 18, 2011 | |
| INVENTOR(S) | : Joseph A. Bianco et al. | |

It is certified that error appears in the above-identified patent and that said Letters Patent is hereby corrected as shown below:

Col. 2 line 57
Please delete the word "system" and insert the word --method--.

Signed and Sealed this
First Day of March, 2011

David J. Kappos
*Director of the United States Patent and Trademark Office*

(12) EX PARTE REEXAMINATION CERTIFICATE (7989th)
United States Patent
Bianco et al.

(10) Number: US 5,438,518 C1
(45) Certificate Issued: Jan. 18, 2011

(54) PLAYER POSITIONING AND DISTANCE FINDING SYSTEM

(76) Inventors: Joseph A. Bianco, 112 Rising Trail Dr., Middletown, CT (US) 06457; Curtis A. Vock, 28 Federal St. 3012, Salem, MA (US) 01970; John V. Bianco, 24 Calvin Rd., Jamaica Plain, MA (US) 02130

Reexamination Request:
No. 90/010,326, Oct. 27, 2008

Reexamination Certificate for:
Patent No.: 5,438,518
Issued: Aug. 1, 1995
Appl. No.: 08/183,594
Filed: Jan. 19, 1994

(51) Int. Cl.
*G01S 5/14* (2006.01)
*A63B 71/06* (2006.01)
*A63B 57/00* (2006.01)

(52) U.S. Cl. .................... 473/407; 340/323 R; 702/150; 702/159

(58) Field of Classification Search .................. None
See application file for complete search history.

(56) References Cited

U.S. PATENT DOCUMENTS

| | | | |
|---|---|---|---|
| 4,910,677 A | 3/1990 | Remedio | 364/410 |
| 5,202,829 A | 4/1993 | Geier | 364/449 |
| 5,220,507 A | 6/1993 | Kirson | 364/444 |
| 5,245,537 A | 9/1993 | Barber | 364/410 |
| 5,319,548 A | 6/1994 | Germain | 364/410 |

FOREIGN PATENT DOCUMENTS

| JP | 04335178 A * 11/1992 |
|---|---|
| WO | WO 93/12439 6/1993 |

OTHER PUBLICATIONS

Product brochure for Pinranger (1992) (6 sheets). (Gunthorpe).

* cited by examiner

*Primary Examiner*—Jeffrey L. Gellner

(57) ABSTRACT

The invention relates to a portable distance tracking system for use by a player on a playing field. The system includes a mobile interface unit that has a memory element, position interface electronics, a data processor, and a player interface. The memory element stores digitized map representations of playing fields. The position interface electronics receivers position indicative signals that are representative of a geographical location of the mobile unit from an external source. The data processor couples to the memory element and to the position interface electronics and correlates the geographical location to a field location of the mobile interface unit on the playing field. The processor also determines the distance from the mobile interface unit to a first landmark. The player interface is coupled to the data processor and communicates the distance between the mobile interface unit and the first landmark to the player. According to a preferred embodiment, the playing field is a golf course and the first landmark is a flag location at a select hole on the golf course.

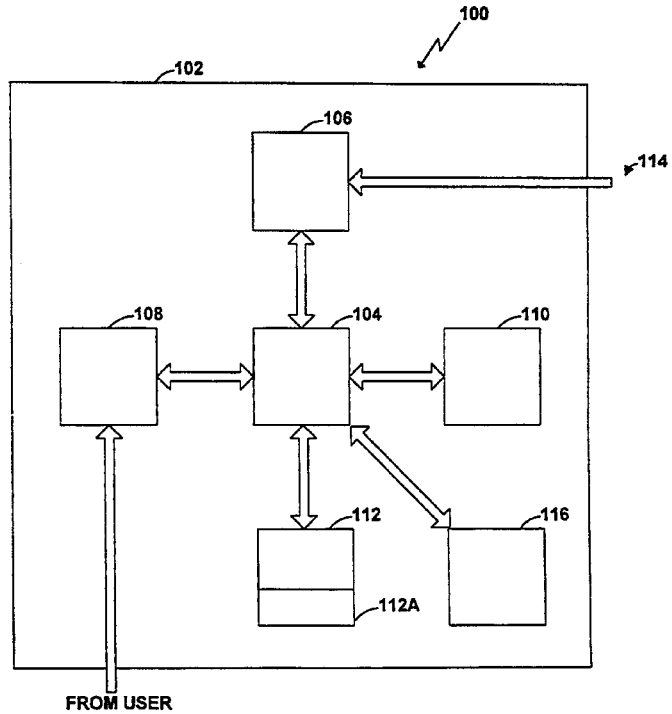

US 5,438,518 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1, 6, 9, 13, 18, 29, 33, 39 and 41 are determined to be patentable as amended.

Claims 2-5, 8, 10-12, 14-17, 19-28, 30-32, 34-38, 40, 42 and 43, dependent on an amended claim, are determined to be patentable.

1. A portable distance tracking system for use by a golfer on a golf course, [wherein said golf course includes at least a first land mark, and wherein said] *the portable distance tracking* system [comprises] *comprising* at least one mobile interface unit including:
   A. a memory element including means for storing digitized map representations of *a plurality of holes on* a plurality of golf courses, *at least a first landmark for each hole, and a tee for each hole*;
   B. position interface electronics including a first GPS receiver for receiving position indicative signals from a Global Positioning System satellite constellation located in orbit around the Earth, wherein said position indicative signals are represenative of a geographical location of said mobile interface unit;
   C. a data processor, coupled to said memory element and to said position interface electronics, and including means for processing said position indicative signals to determine said geographical location of said mobile interface unit, means for corresponding said geographical location of said mobile interface unit with [said digitized map representations] *the tee for a particular hole stored in the memory element* to automatically program [a] *a particular digitized map representation for the* particular [golf course] *hole* that a golfer has selected to play, means for corresponding said geographical location of said mobile interface unit with said digitized map representation of said particular [golf course] *hole* to determine a field location of said mobile interface unit on said particular golf course, and means for determining a distance between said mobile interface unit and said first landmark; and
   D. a player interface, coupled to said data processor, and including means for communicating at least said distance between said mobile interface unit and said first landmark to said player.

6. A portable distance tracking system according to [claims] *claim* 1 wherein said player interface includes an audio interface for communicating information to a player.

9. A portable distance tracking system according to [claims] *claim* 8 wherein said keyboard interface includes means for selecting a particular hole on said particular golf course to be played by signaling said data processor to access a portion of said digitized map representation for said particular golf course from said memory element.

13. A portable distance tracking system according to claim 8 wherein a particular hole has an associated flag location, said landmark is said associated flag location, and said display includes *means* for displaying a distance between said mobile interface unit and said first landmark.

18. A portable distance tracking system according to claim 8 wherein said system includes [means for processing said position indicative signals to automatically determine which particular hole on said particular golf course a golfer has selected to play, and said display includes] means for displaying a graphical representation of at least a portion of said particular hole.

29. A portable distance tracking system according to claim 8 wherein said memory includes means for storing information regarding at least one round of golf on said particular golf course, said keyboard includes means for signaling said processor to recall said information from said memory, and said display includes [mean] *means* for displaying said information, wherein said information includes at least of total score, score on particular holes, clubs selected for particular shots, penalties taken on particular holes, putts taken on particular holes, and distances hit with particular golf clubs.

33. A system for determining the distance between a first location and a second location on a particular hole on a golf course comprising:
   (A) GPS receiver means, positioned at said first location, for receiving a global earth position of said first location;
   (B) a memory element having means for storing digitized map representations of a plurality of holes on a golf course, *at least a first landmark for each hole, and a tee for each hole*; and
   (C) [processing means] *a data processor* in communication with said GPS receiver means, *the data processor comprising*
      i) means for correlating said global earth position with said [digitized map representations] *tee for a particular hole stored in the memory element* to automatically [identify said] *program a particular digitized map representation for the* particular hole on said golf course, and
      ii) means for correlating said first location to said second location to determine *the distance* from said first location to said *second* location.

39. A system according to claim 33 wherein said memory element includes means for storing digitized map representations of a plurality of golf courses and said system includes means for correlating said global earth position with said digitized map representations of said plurality of golf courses to automatically [identify] *program* a particular golf couse that a golfer has selected to play.

41. A system for determining the distance between a first location and a second location on a particular hole on a golf course, comprising:
   (A) receiving a global earth position at a mobile interface unit at a first location from a GPS constellation;
   (B) storing in said mobile interface unit digitized map representations of a plurality of holes on a golf course, *at least a first landmark for each hole, and a tee for each hole*; and
   (C) processing in said mobile interface unit said global earth position and said digitized map representations by i) correlating said global earth position with said [digitized map representations] *tee for a particular hole stored in the memory element* to automatically [identify] *program a particular digitized map representation for* said particular hole on said golf course, and ii) correlating said first location to said second location to determine the distance from said first location to said second location.

\* \* \* \* \*